UNITED STATES PATENT OFFICE.

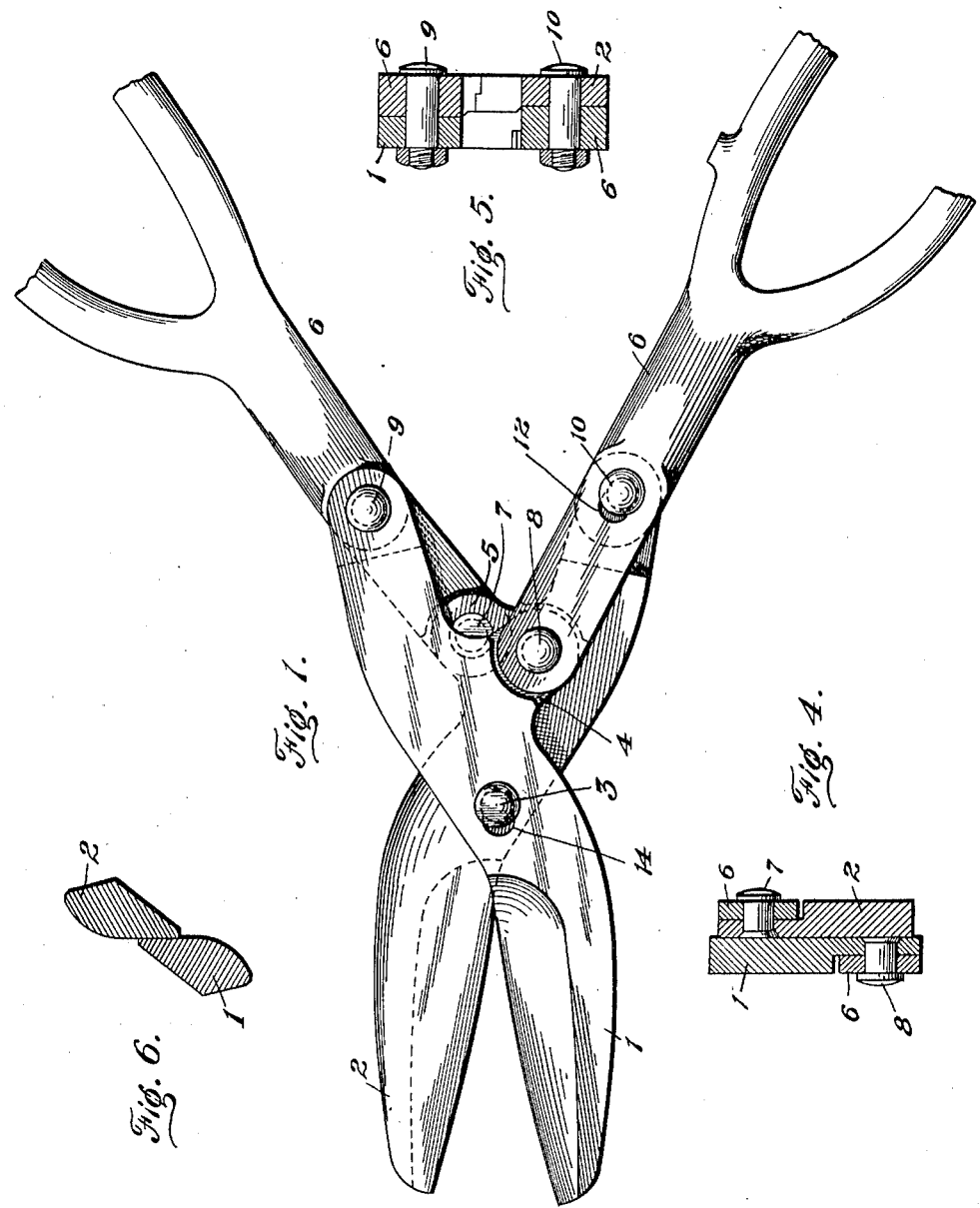

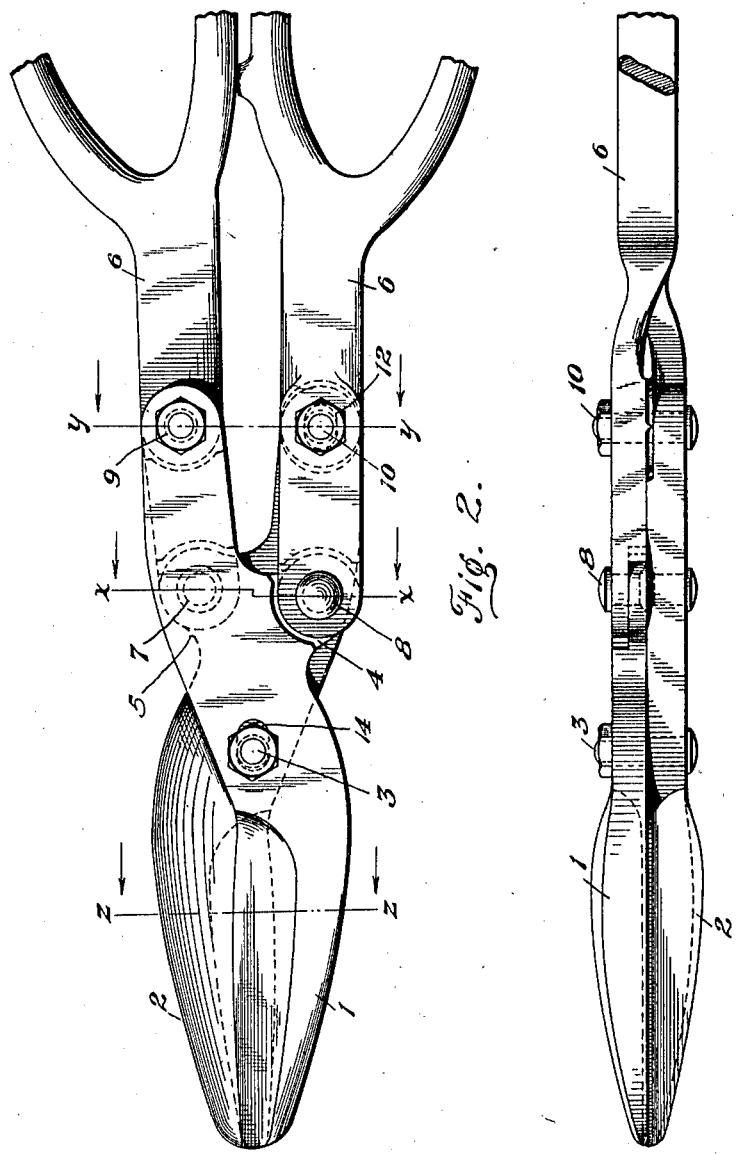

ARTHUR J. STICH, OF DETROIT, MICHIGAN, ASSIGNOR TO INTERNATIONAL TOOL COMPANY, OF DETROIT, MICHIGAN, A CORPORATION OF MICHIGAN.

COMPOUND-LEVER SHEARS.

1,012,289. Specification of Letters Patent. Patented Dec. 19, 1911.

Application filed October 17, 1910. Serial No. 587,628.

*To all whom it may concern:*

Be it known that I, ARTHUR J. STICH, a citizen of the United States of America, residing at Detroit, in the county of Wayne and State of Michigan, have invented certain new and useful Improvements in Compound-Lever Shears, of which the following is a specification, reference being had therein to the accompanying drawings.

This invention relates to hand shears of the character known as compound lever shears and the invention consists in the novel manner in which the compound leverage is obtained, with the object in view to adapt the shears more specifically for cutting sheet metal, all as more fully described hereinafter and shown in the accompanying drawings, in which—

Figure 1 is a plan view showing the shears open; Fig. 2 is a similar view showing the shears closed; Fig. 3 is a side elevation thereof; Fig. 4 is a cross section on line $x$—$x$ of Fig. 2; Fig. 5 is a cross section on line $y$—$y$ of Fig. 2; and Fig. 6 is a cross section on line $z$—$z$ of Fig. 2.

Referring to the drawings 1 and 2 are the shear blade members pivoted together by a pivot pin 3 and forming cross levers as in ordinary cutting shears. The rear ends or shanks of these blade members, which are about of the same length as the blades, are provided on the back with lateral extensions 4, 5 to which the ends of the two handle levers 6 are pivotally secured by pivot pins 8 and 7 respectively and the ends of the shanks of the blade members are secured by pivot pins 9 and 10 to the handle levers. In thus connecting the handle levers to the shanks of the blades it will be seen that the pivots 7 and 8 may be considered as the fulcrums of the handle levers and the pivots 9 and 10 as the power connections with the shanks of the blades and as the respective distances between these pivots is less than the length of the shanks, an increase in power is obtained by compound leverage. A very suitable arrangement is to make the short arm of the handle levers about half the length of the shanks so that the pivots 7 and 8 are about midway between the pivot 3 and the pivots 9 and 10 respectively, and substantially in such alinement with each other as to make the parts fold upon each other in the closed position of the shears. As each of the two systems of levers is thus pivotally connected together at three points provision must be made for one of the members to have a sliding engagement with one of the pivots. To this end I provide one of the two handle levers with a play slot 12 in which the pivot 10 is free to slide but instead of forming a like play slot in the other handle lever I preferably provide the blade with which it has the power connection, with a play slot 14 for the crossing pivot. By this arrangement I obtain the advantage that during the cutting action of the blades, the blade having the slot is given a longitudinal sliding movement in relation to the other blade and thus produces a drawing shear cut which is most pronounced at the beginning of the cut when it is most desirable since the grip of the hand is then the least powerful, and besides the shears take better hold in cutting and wear less at the throat of the cutting edges where the wear is greatest.

What I claim as my invention:

1. A compound lever shears comprising a pair of like blade members in crossed pivotal connection each provided on its back intermediate its rear end and the crossing pivot with a lateral extension, and a pair of hand levers each pivotally secured at a point intermediate its length to the rear end of one of the blade members respectively, and at its forward end to the lateral extension of the other blade member respectively, said levers overlying the blade members in the planes of said members respectively.

2. A compound lever shears comprising a pair of like blade members in crossed pivotal connection each provided on the back of the member intermediate the crossing pivot and its rear end with a lateral extension, and a pair of hand levers overlying with their forward portions the rear portions of the blade members in rear of said extensions, respectively, each being pivotally connected at its forward end to the lateral extension of one of the blade members and at a point intermediate its length to the rear end of the other blade member.

3. A compound lever shears comprising a pair of like blade members in crossed pivotal connection each provided on the back of the member intermediate the crossing pivot and the rear end with a lateral extension, and a pair of hand levers overlying with their forward portions the portions of the blade members in rear of said extensions respectively, each lever being pivotally connected at its forward end to the lateral extension of one of the blade members and at a point intermediate its length to the rear end of the other blade member, the pivotal connections of the levers being respectively on opposite sides of the longitudinal center line of the shears.

4. A compound lever shears comprising a pair of like blade members in crossed pivotal connection each provided on the back of the member intermediate the crossing pivot and the rear end with a lateral extension, and a pair of hand levers overlying with their forward portions the portions of the blade members in rear of said extensions and in the respective planes of said members, each lever being pivotally connected at its forward end to the lateral extension of one of the blade members and at a point intermediate its length to the rear end of the other blade member.

5. A compound lever shears comprising a pair of like blade members in crossed pivotal connection each provided on its back intermediate its end and the crossing pivot with a lateral extension, and a pair of hand levers overlying with their forward portions the rear portions of the blade members in the planes of said members respectively, and wholly upon opposite sides respectively of the center line of the shears, each lever being pivotally connected at its forward end to the lateral extension of one of the blade members and at a point in rear thereof to the rear end of the other blade member.

6. A compound lever shears comprising a pair of like blade members in crossed pivotal connection, and a pair of hand levers overlying with their forward portions the rear portions of the blade members in rear of said pivotal connection and substantially in the planes of said members respectively, each lever being pivotally connected intermediate its length to the rear end of one of the blade members and at its forward end to the other blade member at a point in rear of the pivotal connection of the members and on the same side of the center line of the shears as its other connection, suitable provision being made by means of longitudinal play slots for the angular movement of the parts in relation to each other.

7. A compound lever shears comprising a pair of like blade members in crossed pivotal connection, one of the members being provided with a longitudinal play slot for the pivot, and a pair of hand levers overlying with their forward portions the rear portions of the blade members in rear of said pivotal connection and in the planes of said members respectively, each lever being pivotally connected intermediate its length to the rear end of one of the blade members and at its forward end to the other blade member at a point in rear of the pivotal connection of the members and on the same side of the center line of the shears as its other connection, one of said levers being provided with a longitudinal play slot for one of its pivots.

In testimony whereof I affix my signature in presence of two witnesses.

ARTHUR J. STICH.

Witnesses:
ANNA M. DORR,
LEWIS E. FLANDERS.

---

Copies of this patent may be obtained for five cents each, by addressing the "Commissioner of Patents, Washington, D. C."